Oct. 12, 1948.  W. W. WILLIAMS  2,451,008
REACTION JET SYSTEM FOR AIRCRAFT CONTROL
Filed March 26, 1945  4 Sheets-Sheet 1

INVENTOR
WILLIAM W. WILLIAMS
BY
Beau, Brooks, Buckley & Bean
ATTORNEYS

Oct. 12, 1948.  W. W. WILLIAMS  2,451,008
REACTION JET SYSTEM FOR AIRCRAFT CONTROL
Filed March 26, 1945  4 Sheets-Sheet 2

INVENTOR
WILLIAM W. WILLIAMS
BY
Bean, Brooks, Buckley & Bean. ATTORNEYS

INVENTOR
WILLIAM W. WILLIAMS
BY
ATTORNEYS

Oct. 12, 1948.   W. W. WILLIAMS   2,451,008
REACTION JET SYSTEM FOR AIRCRAFT CONTROL
Filed March 26, 1945   4 Sheets-Sheet 4
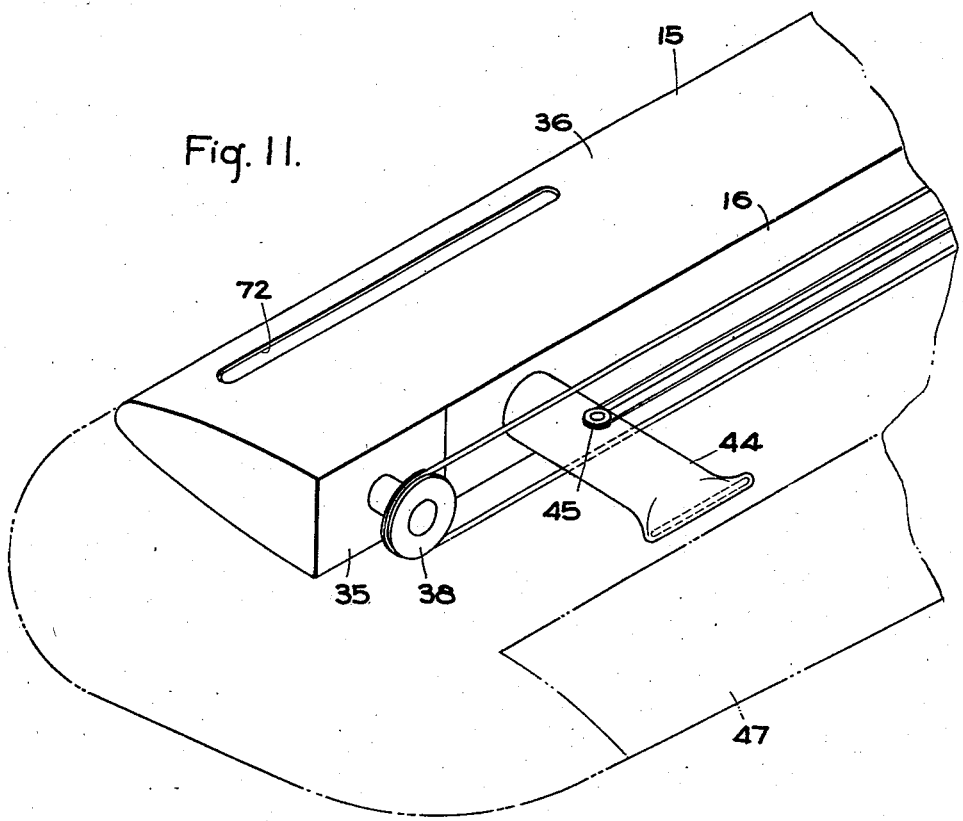
INVENTOR
WILLIAM W. WILLIAMS
BY
Bean, Brooks, Buckley, Bean.   ATTORNEYS Patented Oct. 12, 1948

2,451,008

UNITED STATES PATENT OFFICE 2,451,008

REACTION JET SYSTEM FOR AIRCRAFT CONTROL

William W. Williams, Buffalo, N. Y., assignor to Bell Aircraft Corporation, Buffalo, N. Y.

Application March 26, 1945, Serial No. 584,923

1 Claim. (Cl. 244—52)

This invention relates to aircraft and more particularly to improvements in aircraft flight control means.

One of the objects of the invention is to provide improvements in pitch, roll, and yaw control means for aircraft. Another object of the invention is to provide an airplane having improved propulsion and flight control arrangements. Another object of the invention is to provide improved control means particularly for high speed aircraft whereby adverse control conditions may be more readily corrected. Another object of the invention is to provide improvements in airplane propulsion and flight control and de-icing means.

Another object of the invention is to provide an improved airplane control system which is less vulnerable than prior airplane control mechanisms to gun fire damage and the like. Another object of the invention is to provide improvements in airplane control systems resulting in reduction of pilot fatigue and pilot errors. Another object of the invention is to provide an improved airplane flight control means adapted to procure proper control forces in high performance aircraft and positive control irrespective of flight speed. Other objects and advantages of the invention will appear in the specification hereinafter.

In the drawings:

Fig. 11 is a view similar to Fig. 8 of another form of lateral control means of the invention.

Figure 1:
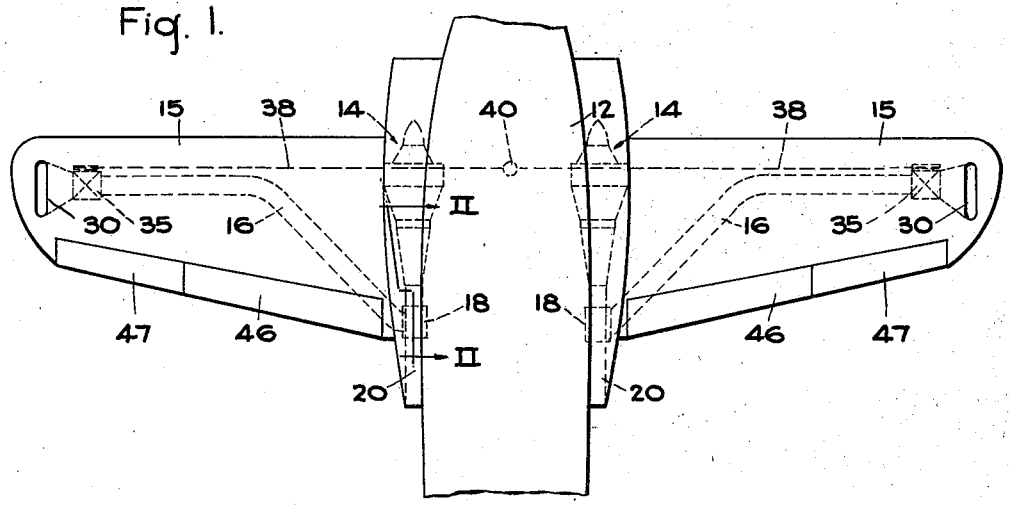
Fig. 1 is a fragmentary diagrammatic plan of an airplane embodying control means of the invention.
Figure 2:
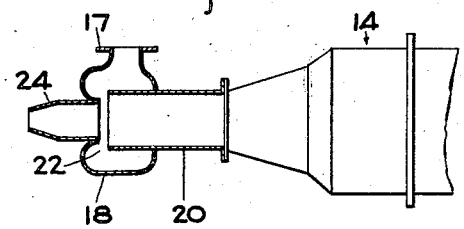
Fig. 2 is a fragmentary section as along line II—II of Fig. 1, showing a power unit connection detail.

The invention is illustrated in the drawing, for example, in Fig. 1 in an airplane of the jet or turbo-engine propulsion type wherein the airplane fuselage 12 is arranged to mount a pair of jet or turbo-engine propulsion units as indicated at 14—14 to provide forward propulsion of the airplane. However, it is to be understood that the invention is equally as applicable to single engine type aircraft, or to other multi-engine type arrangements. The wing panels 15—15 extending from the fuselage 12 are provided to include pressured gas ducts 16—16 which connect as at 17 (Figs. 2–3) to annular cuffs 18 which encircle the "tail pipe" portions 20 of the power units 14—14. In Fig. 2 the tail pipe 20 is shown to terminate at a position interiorly of the cuff 18 so as to provide an annular opening 22 for diverting a portion of the gas discharge from the power unit into the cuff 18 and thence through the connected duct 16 (Fig. 1); a reduced size end jet 24 being carried by the cuff 18 in extension of the tail pipe 20 for directing the majority of the gas blast against the atmosphere rearwardly of the power unit.

Figure 3:
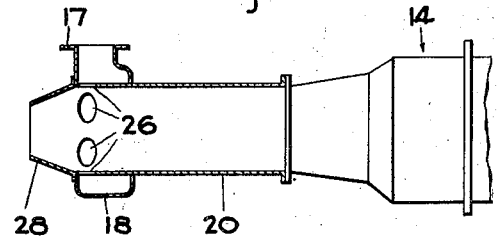
Fig. 3 is a view similar to Fig. 2 of another form of power unit connection.
Figure 4:
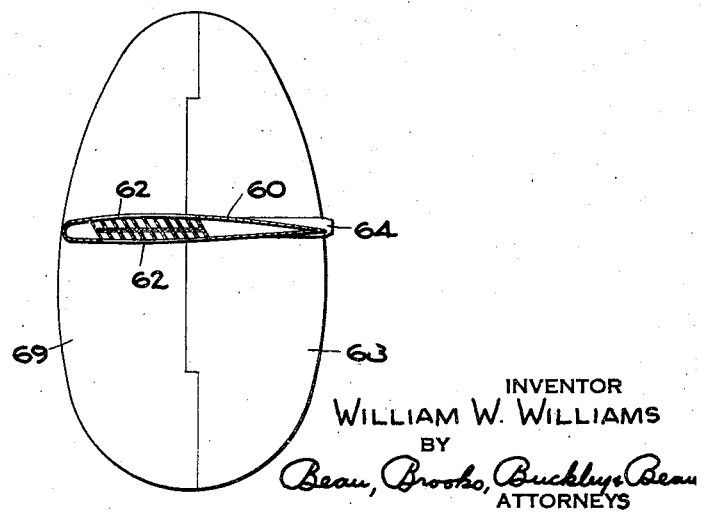
Fig. 4 is a view partly in side elevation and partly in section of a tailless type airplane incorporating control means of the invention.
Figure 5:
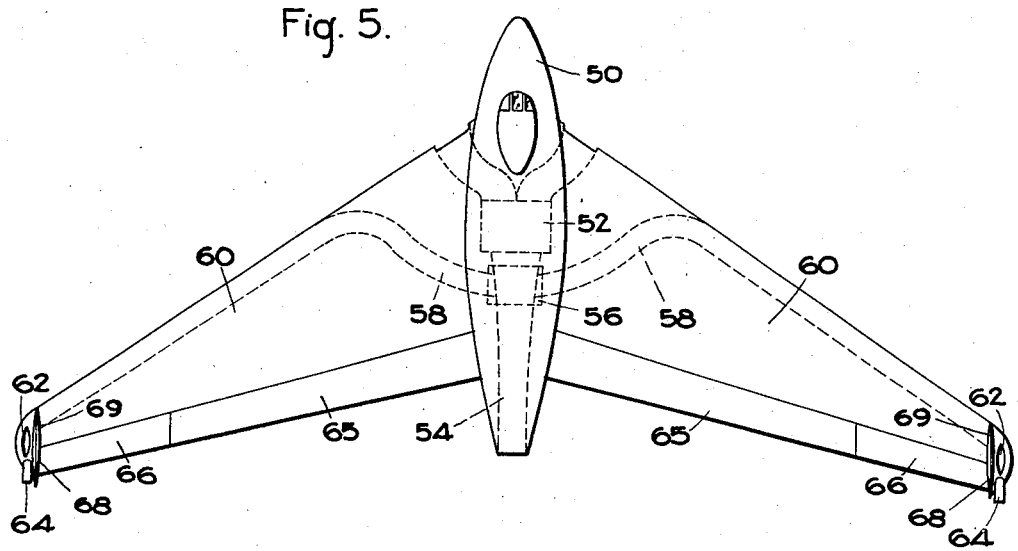
Fig. 5 is a top plan of a complete airplane incorporating the wing and rudder arrangements of Fig. 4.
Figure 6:
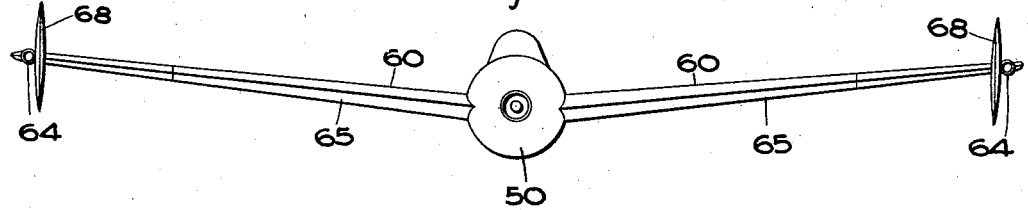
Fig. 6 is a front elevation of the airplane of Fig. 5.
Figure 7:
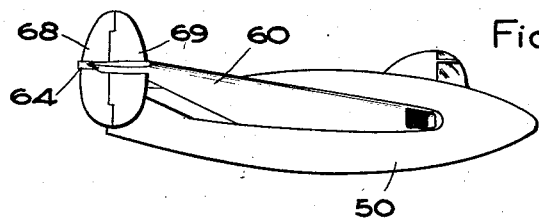
Fig. 7 is a perspective thereof.

In Fig. 3 the tail pipe 20 is illustrated to be perforated at intervals annularly thereof as indicated at 26 within the confines of the cuff 18 whereby a portion of the power unit gas discharge may pass through the openings 26 into the cuff and thence into the connected duct 16; the tail pipe 20 terminating in a reduced size jet portion as indicated at 28 for directing the majority of the discharge gas blast rearwardly of the power unit. Thus, Figs. 2–3 illustrate alternative forms of gas discharge diversion arrangements interiorly of the cuffs 18; and it will be understood that for this purpose any suitable arrangement may be employed whereby portions of the power unit gas discharge may be diverted into duct devices as indicated at 16 for flight control purposes as will be explained hereinafter.

Figure 8:
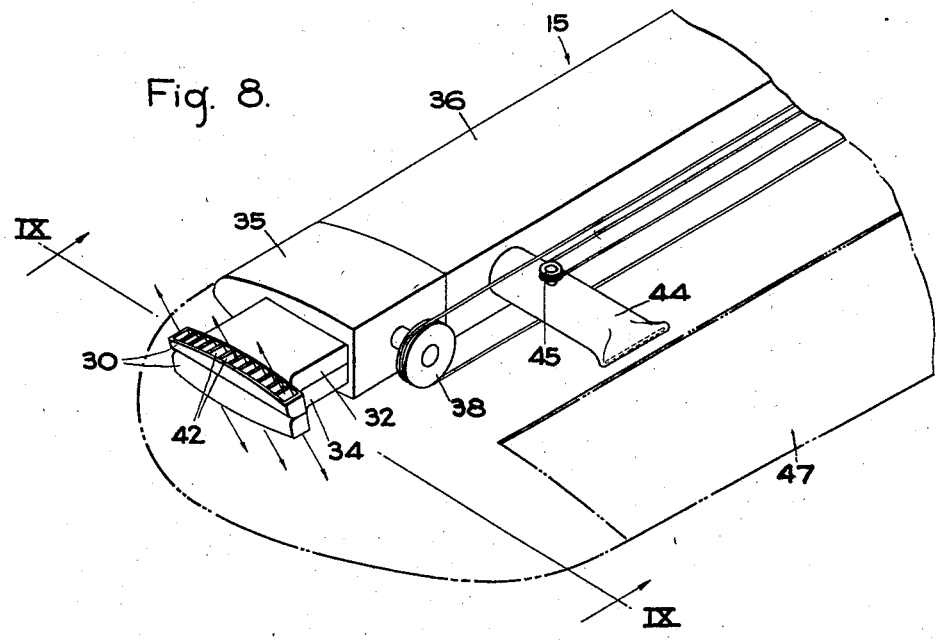
Fig. 8 is a fragmentary perspective of a wing panel embodying lateral control means of the invention as in the case of Fig. 1.
Figure 9:
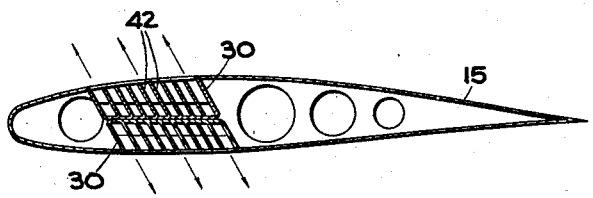
Fig. 9 is a vertical section as along line IX—IX of Fig. 8.

In Fig. 1 the ducts 16—16 are arranged to extend through the interiors of the wing panels 15—15 to connect into slot-shaped orifices 30—30 in each of the wing tip portions; the orifices being disposed to extend chordwise of the wing and to be adapted to discharge pressured gases both upwardly and downwardly above and below the wing tips. Figs. 8–9 illustrate in greater detail such an arrangement of discharge orifices in one of the wing tips; the upper and lower orifices being arranged to be fed by corresponding upper and lower ducts 32—34 leading from a common valve chamber 35. The valve chamber 35 is in turn arranged to be fed by a duct corresponding to 16 shown in Fig. 1; although in Fig. 8 the feed duct is illustrated at 36 to constitute the leading edge portion of the wing panel. However, it will be understood that the duct leading to the valve 35 may conveniently comprise any conduit device or the hollow interior of a box beam or leading edge primary structure of the wing panel, or the like such as may be employed to interconnect the gas take-off cuff 18 to the orifice valving device 35. Also, it will be appreciated that in any case the passage of heated gases through the duct devices within the wing will provide direct heating of the wing structure such as may be beneficially employed particularly in the wing leading edge portions to eliminate icing difficulties.

The valving devices 35 are arranged to be controlled from the pilot cockpit by means of any suitable control devices such as cable-pulley systems as indicated at 38, whereby simple manipulation of any conventional pilot control device such as a joy stick or rotating wheel column or the like as indicated at 40 (Fig. 1) will procure selective operation of the gas discharge orifices 30 at the wing tips. For example, the control means 40 will be so arranged that whenever it is disposed in its neutral attitude the valving devices 35—35 will be closed so as to prevent gas discharges through any of the orifices 30. However, upon displacement of the pilot control device 40 in such direction as would conventionally procure rolling of the aircraft to the right, for example, the valving means 35—35 of the invention will connect the upper orifice in the right hand wing panel tip and the lower orifice in the left hand wing panel tip into open communication with the corresponding ducts carrying pressured gases from the propulsion units. Thus, a blast of gas will project upwardly from the right hand wing tip and another blast of gas will project downwardly from the left hand wing tip so as to produce a reaction force couple tending to roll the airplane to the right. Reversely, movement of the pilot control element 40 in opposite direction will cause gas blasts to project upwardly from the left hand wing tip and downwardly from the right hand wing tip, whereby to produce a reaction force couple tending to roll the airplane to the left; thereby providing means for lateral control of the airplane irrespective of the forward speed of the aircraft.

Preferably, as illustrated in Figs. 8—9 the orifices 30 will be arranged to direct their gas blasts in oblique directions. That is, the upper orifices will direct their gas blasts upwardly and forwardly while the lower orifices will direct their gas blasts downwardly and rearwardly; and to facilitate this operation the orifices may be internally vaned as indicated at 42 in Figs. 8—9. Thus, the lateral control producing gas blasts will also provide automatically some degree of yaw producing forces which are consonant with the corresponding rolling couples for directional turn purposes; and the aircraft may thereby be steered and automatically properly banked incidental to each steering maneuver by single manipulations of the pilot control element 40. In such case the airplane control system may or may not include a conventional type ruddering device in addition to the jet orifices referred to hereinabove, as may be required in any instance of airplane design.

A gas bleeder such as a conduit 44 (Fig. 8) may be provided in open communication with the wing ducts and selectively controlled from the pilot cockpit as by a valve control 45 whereby to provide continued flow of hot gases through the ducts even under orifice closed conditions. The bleeder 44 may of course be arranged to discharge the heated gases at any desired points within the wing structure, or externally thereof, as may be preferred.

It is contemplated that the gas blast lateral control means of the invention may comprise either the sole lateral control means of the aircraft or may be used in conjunction with conventional lateral control devices for emergency power-off conditions. Hence, full span length wing flaps comprising elements 46—47 may be arranged so as to be normally controlled from the cockpit in such manner that the flap sections 46—46 at opposite wing panels move downwardly in unison; but an overtravel mechanism may be employed on the aileron cockpit control so as to procure differential motions of the outboard flap portions 47—47 thereof for emergency aileron control of the aircraft such as when gliding in under power-off conditions.

Figs. 4—7 inclusive illustrate application of the control system of the invention to a "tailless" type airplane comprising a fuselage 50 which houses a power unit 52 having a tail pipe 54 and an enclosing cuff 56 for diverting a portion of the power unit discharge into ducts 58—58 built within the wing panels 60—60 to extend into connection with corresponding gas discharge orifices 62 in the wing tips; said orifices corresponding to the orifices 30 of Fig. 1. As in the case of the orifices of Fig. 1, the orifices 62 will be arranged to discharge through the upper and lower surfaces of the wing panels, and will be selectively controlled by suitable duct valving devices for lateral control purposes as explained hereinabove. Also, in the case of Figs. 4—7, the duct valving devices will communicate with rearwardly directed jets 64—64 at each wing tip; and the duct valve devices will be arranged to be selectively controlled so as to either completely close the ducts 58 or to open them into gas discharge communication with either the upwardly or downwardly directed orifices 62 and/or the rearwardly directed orifices 64. Furthermore, it is contemplated that in connection with this arrangement of the control means of the invention the jets 64—64 will be provided to be alternately operable to provide suitable yawing tendencies in consonance with rolling couples produced by oppositely directed discharges through the upper and lower orifices 62—62 at the wing tips. Thus, the system will automatically or selectively produce simultaneous rolling and yawing tendencies for effectively steering the aircraft through directional turn maneuvers.

As indicated at 65—66 full span length wing flaps may be employed at the wing trailing edges and controlled from the pilot cockpit in conventional manner; and the outboard portions 66—66 opposite of the wing flaps may be arranged if desired to be differentially operable from the pilot cockpit for emergency aileron control purposes as explained hereinabove in connection with Fig. 1. Also, conventional type rudders 68—68 may be employed by being mounted upon stationary fins 69—69 for emergency ruddering operation under power-off conditions as explained hereinabove. In either case, it will be understood that the control arrangement of the invention provides that normally and under power-on conditions the pilot will have available a flight control means of optimum sensitivity and flexibility such as does not involve the adverse control effects of conventional moving-flap type control devices.

Figure 10:
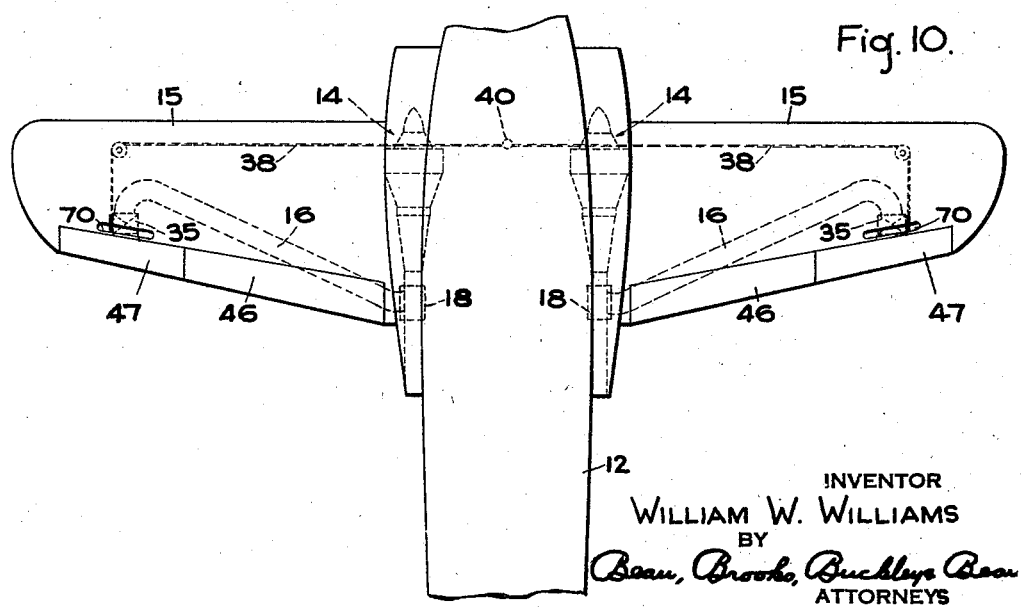
Fig. 10 is a view similar to Fig. 1 showing another control arrangement of the invention.

Fig. 10 illustrates a form of the control arrangement of the invention which is generally similar to that of Fig. 1 except that in the case of Fig. 10 the gas orifices are disposed to extend generally spanwise of the wing and just ahead of the hinge lines of the control flaps 46–47 thereon. As in the case of the arrangement of Fig. 1, the control arrangement of Fig. 10 will embody dual gas orifices in each wing tip; that is, one orifice for directing a gas discharge blast upwardly and another orifice for directing a gas blast downwardly; and the duct valving devices 35—35 will be similarly arranged to permit the pilot to selectively control the gas blasts issuing from the orifices 70 so as to procure the desired rolling tendencies.

Fig. 11 illustrates another form of lateral control arrangement of the invention which is generally similar to the arrangements of Figs. 1 and 10 except that in the case of Fig. 11 the gas blast orifices 72 at each wing tip are disposed to extend within the leading edge portion of the wing panels in directions spanwise thereof. Thus, the gas blast orifices 72 are arranged in pairs at each wing tip; that is, one orifice will be arranged to discharge a gas blast upwardly while the other orifice is arranged to discharge a gas blast downwardly; and the associated valve device 35 will be adapted to alternately connect the upper and lower orifices in open communication with the pressured gas ducts 36, as in the case of Fig. 8.

In operation, when at relatively low altitudes where a denser atmosphere is met whenever the valving devices 35—35 are pilot-actuated, for example, so as to procure discharge of pressured gas through the upper orifice in the left hand wing tip, the gas issuing therefrom will be injected under the airstream flowing over the upper surface of the wing tip (throughout the span of the orifice 72) in such manner as to feed the partial vacuum therebetween and perhaps to set up a condition of turbulence therein, thereby decreasing the lift effects on the left hand wing tip. At the same time, the valving device 35 in the right hand wing tip will have been operated so as to procure discharge of pressured gas through the bottom orifice 72 of the right hand wing tip, and this will result in bolstering the positive pressure forces of the relative airstream against the bottom surface of the right hand wing tip. The result will be a force couple tending to roll the airplane to the left; and reversely, when the pilot control device is actuated so as to open the bottom left hand orifice and the top right hand orifice a reversely directed force couple will be generated to roll the airplane to the right.

A particular feature and advantage of the control arrangement of the invention over prior art moving-flap control devices for example is that in the case of the invention the reaction producing gas blasts may be so controlled and regulated as to initiate rolling moments with utmost smoothness and without adverse control characteristics such as almost invariably accompany actuation of the prior art control devices.

As distinguished from the operation of the control arrangement of Fig. 10, the operation of the control arrangement of Fig. 11 is productive of somewhat different results in that it procures the rolling moments referred to hereinabove largely as the result of gas jet reactions against the atmosphere layers externally of the wing panels, whereas in the arrangement of Fig. 11 the control effects are obtained more indirectly by modifying the nature of the relative airstream flow past the upper and lower wing surfaces. The arrangement of Fig. 11 will be more adaptable for use under relatively high speed flight conditions, although the valving mechanism thereof may be so regulated as to also procure suitable control effects of the jet reaction type even under low speed flight conditions. The arrangement of Fig. 10 may in some cases possess the advantage of providing lesser overall drag than in the case of the arrangement of Fig. 11; but the arrangement of Fig. 11 possesses the advantage of providing maximum control effects in return for minimum power expenditures.

The invention also contemplates that suitable differential mechanisms may be included in the pilot control means for the duct valving devices whereby the gas orifices at the right and left hand wing tips may simultaneously project gas blasts either upwardly or downwardly from the wing tips, thereby providing aircraft pitch control forces independent of lateral control operation thereof. Thus, depending upon the longitudinal position of the gas jets relative to the longitudinal position of the aircraft pitch axis, downward blasts from both wing tips will cause the airplane to pitch either upwardly (as in the arrangement of Fig. 1) or downwardly (as in the arrangement of Figs. 4–7); and in any case the need for additional conventional type elevator control means will be thereby eliminated. However, as explained hereinabove, it is contemplated that the jet type control devices of the invention may be effectively employed as adjuncts to conventional type pitch yaw and roll control flaps or the like; and that in such cases the conventional type control flaps may be provided of smaller than usual dimensions because the combined operations of such flaps and associated jets will procure adequate control effects even under minimum flight speed conditions.

Thus, it will be appreciated that the control means of the invention provides numerous advantages such as positive control regardless of flight speed, as well as improved mode of control force developments such as may be corrective of adverse control conditions normally encountered. Also, the control system of the invention may be so constructed as to be less vulnerable to gun fire damage than mechanical or hydraulic type control mechanisms of the prior art, and inasmuch as the control means of the invention may be constructed so as to automatically provide suitable combinations of rolling and yawing moments the invention may result in reduction of pilot fatigue and pilot errors. Also, the control system of the invention permits the use at the wing trailing edges of full span length flaps; and the jet supply ducts may be so arranged within the wing panels as to provide efficient icing prevention effects incidental to the primary control functions thereof.

Another important feature and advantage of the invention is that the gas jet type control system of the invention may be installed as a natural adjunct to the propulsion unit or units in jet or turbine powered aircraft. It is estimated, for example, that the energy momentarily required for lateral control purposes when using jet devices of the invention would not exceed 10% of the total output of the aircraft jet or turbine power unit, and that the weight of the gas ducts within the wing panels when used for de-icing purposes would not exceed the weight of conventional elastic boot type de-icing equipment.

It will be appreciated that although only a few of the possible applications of the invention have been shown and described in detail various other applications may be effected and that various changes may be made in the structures illustrated and described hereinabove without departing from the spirit of the invention and the scope of the following claim.

I claim:

In an aircraft, in combination, a jet propulsion power unit having a tail pipe for directing the gas discharge from said power unit rearwardly of said aircraft for motivating said aircraft and a reaction flight control device for rotating the aircraft about a flight control axis thereof, said control device comprising a pair of jets each of which is disposed to receive a gas blast from said tail pipe and to direct it upwardly, a pair of jets each of which is disposed to direct a gas blast downwardly, said paired jets being disposed exteriorly of the aircraft at positions oppositely remote from said flight control axis, gas take off means in communication with the interior of said tail pipe for diverting through said jets a portion of the gas discharge from the tail pipe of the power unit, and control means for selectively directing the gas received from said take off means to the pair of upper jets, the pair of lower jets, and opposite upper and lower jets.

WILLIAM W. WILLIAMS.

REFERENCES CITED

The following references are of record in the file of this patent:

UNITED STATES PATENTS

| Number | Name | Date |
|---|---|---|
| 1,879,717 | Sikorsky | Sept. 27, 1932 |
| 2,085,761 | Lysholm | July 6, 1937 |

FOREIGN PATENTS

| Number | Country | Date |
|---|---|---|
| 11,784 | Great Britain | 1911 |